(12) United States Patent
Thebolt

(10) Patent No.: US 6,758,008 B1
(45) Date of Patent: Jul. 6, 2004

(54) RODENT TRAP CONTAINMENT APPARATUS AND A METHOD FOR MAKING THE SAME

(76) Inventor: Richard B. Thebolt, 6806 Highridge Rd., West Bloomfield, MI (US) 48324

( * ) Notice: Subject to any disclaimer, the term of this patent is extended or adjusted under 35 U.S.C. 154(b) by 0 days.

(21) Appl. No.: 10/291,995

(22) Filed: Nov. 12, 2002

(51) Int. Cl.⁷ .............................................. A01M 1/10
(52) U.S. Cl. ............................... 43/58; 43/81; D22/119
(58) Field of Search ............................... 43/58, 60, 61, 43/81; 206/557; 220/676; D9/432, 430, 424, 433; D22/119

(56) References Cited

U.S. PATENT DOCUMENTS

| | | | | |
|---|---|---|---|---|
| 1,009,463 A | * | 11/1911 | Bloomer | D9/433 |
| 1,218,406 A | * | 3/1917 | Jackson | 43/81 |
| 1,234,763 A | * | 7/1917 | Chapman | 220/676 |
| 1,275,993 A | * | 8/1918 | Spangler | 43/81 |
| 1,349,177 A | * | 8/1920 | Wiemer | 43/81 |
| 1,511,123 A | * | 10/1924 | Hart | 43/81 |
| 1,690,369 A | * | 11/1928 | Harte | 43/81 |
| 1,792,774 A | * | 2/1931 | Snider | 43/81 |
| 1,867,738 A | * | 7/1932 | Fraser | 206/557 |
| 1,997,932 A | * | 4/1935 | Houts | 43/81 |
| 2,222,653 A | * | 11/1940 | Chambless et al. | 43/81 |
| 2,332,334 A | * | 10/1943 | Morrison | 43/81 |
| 2,828,059 A | * | 3/1958 | Ross | 206/557 |
| 2,962,836 A | * | 12/1960 | Hughes | 43/58 |
| 3,208,583 A | * | 9/1965 | Kamps | 206/557 |
| 3,251,529 A | * | 5/1966 | Young | D9/432 |
| D206,774 S | * | 1/1967 | Reny | D9/424 |
| 3,672,530 A | * | 6/1972 | Bridenstine et al. | 206/557 |
| 3,682,351 A | * | 8/1972 | De Putter | 220/676 |
| 3,769,742 A | * | 11/1973 | Spain et al. | 43/81 |
| 4,030,230 A | * | 6/1977 | Souza | 43/81 |
| 4,270,299 A | * | 6/1981 | Long | 43/58 |
| 4,403,438 A | * | 9/1983 | West-Harron | 43/81 |
| D271,942 S | * | 12/1983 | Goldman | D9/424 |
| 4,703,583 A | * | 11/1987 | Dzurkovich et al. | 43/81 |
| D307,716 S | * | 5/1990 | Fitzloff et al. | D9/424 |
| 5,148,624 A | * | 9/1992 | Schmidt | 43/81 |
| 5,265,756 A | * | 11/1993 | Meier et al. | 206/557 |
| D346,199 S | * | 4/1994 | Spragins et al. | D22/119 |
| D349,813 S | * | 8/1994 | Schwartzkopf | D9/424 |
| 5,588,249 A | * | 12/1996 | Flinner | 43/61 |
| 5,690,275 A | * | 11/1997 | Bose et al. | 220/676 |
| D394,205 S | * | 5/1998 | Bates | D9/346 |
| 5,911,320 A | * | 6/1999 | Forestelle | 220/676 |
| 5,930,944 A | * | 8/1999 | Knuppel | 43/58 |
| D425,960 S | * | 5/2000 | O'Hara | D22/119 |
| D427,524 S | * | 7/2000 | Weisz | D9/432 |
| 6,164,010 A | * | 12/2000 | Snell et al. | 43/61 |
| 6,266,917 B1 | * | 7/2001 | Hight | 43/58 |
| D477,217 S | * | 7/2003 | Riedi | D9/432 |

FOREIGN PATENT DOCUMENTS

| | | | | |
|---|---|---|---|---|
| EP | 79225 B1 | * | 5/1983 | |
| FR | 2537837 B1 | * | 6/1984 | 43/58 |
| FR | 2614179 B1 | * | 10/1988 | |
| GB | 2252485 B1 | * | 8/1992 | |
| JP | 2001-333683 B1 | * | 12/2001 | |
| WO | WO-90/04920 B1 | * | 5/1990 | |

\* cited by examiner

Primary Examiner—Darren W. Ark
(74) Attorney, Agent, or Firm—Law Offices of John Chupa & Associates, P.C.

(57) ABSTRACT

An apparatus (10) and a method for making an apparatus (10) having a base portion (20) and a plurality of walls (12–18), wherein each of the plurality of walls (12–18) have at least one entry aperture (22), each of which having a certain width (30) which is substantially smaller than the width (51) of a conventional rodent trap (50) and a plurality of identical arcuately shaped extending ridges (24) which traverse the entire periphery of the plurality of walls (12–18), effective to contain a conventional rodent trap (50) and a rodent (100).

17 Claims, 5 Drawing Sheets

RODENT TRAP CONTAINMENT APPARATUS AND A METHOD FOR MAKING THE SAME

FIELD OF THE INVENTION

The present invention generally relates to a rodent trap containment apparatus and a method for making the same, and more particularly, to an apparatus which is reusable and durable and which does not allow a rodent to escape once the rodent has entered the apparatus and has at least a portion of its body trapped in a conventional rodent trap.

BACKGROUND OF THE INVENTION

Mousetraps or rodent traps are well known in the art to either actively kill a rodent or passively trap a rodent without killing the rodent. One well known conventional mousetrap or rodent trap comprises a wooden base upon which a selectively movable bar is attached. Particularly, the selectively movable bar is forcibly biased in a downward direction by the use a substantially powerful pair of springs and held in place by a lever and a support rod. This well known conventional mousetrap or rodent trap utilizes the pressure or weight of a rodent to trip or spring the lever which, in turn, releases the biased movable bar and traps or kills the rodent.

This type of conventional mousetrap or rodent trap suffers from some drawbacks. For example and without limitation, the force applied to a rodent by the selectively movable bar may rupture the body of the rodent which may project bodily fluids and entrails of the rodent to locations remote of the conventional rodent traps wooden base. The projection of bodily fluids and entrails requires a user of this conventional mousetrap or rodent trap to undesirably clean and disinfect any and all areas which may have come in contact with the bodily fluids and/or entrails. Furthermore, bodily fluids and entrails of rodents may harbor several diseases and bacterium which could prove harmful to humans and, cleaning of these fluids and entrails requires substantially close encounters to the fluids and entrails with the user and, in some cases direct human contact, thereby potentially causing a health risk to the user of these conventional mousetraps or rodent traps.

Moreover, this conventional type of mousetrap or rodent trap may only trap a portion of a rodent. That is, a rodent may jump or partially dodge the selectively movable bar, thereby only getting a portion of the rodent's body, such as a tail or a leg trapped in the conventional mousetrap or rodent trap. In this manner, a rodent may escape from immediate death by dragging the conventional mousetrap or rodent trap to a hidden location. At this time, the rodent may gnaw its own leg or tail off or simply die from the injuries inflicted by the trap or from an infection from the wounds created by the trap or the gnawing off of the rodent's limb. In this manner, the rodent may live and continue to inhabit an area which is undesirable to an individual or may die in an area that the individual can not locate which is also undesirable to an individual. Furthermore, in either case, the rodent's carcass or limb (e.g., leg or tail) will eventually rot, which creates a potential health risk to humans (e.g., the carcass or limb may harbor disease and/or bacterium), creates an unpleasant odor (i.e., the odor of rotting flesh), and may allow for houseflies to lay eggs within the carcass or limb, thereby creating a large population of houseflies which may be annoying, further create a health risk to humans (e.g., by spreading bacterium), and creating unsanitary conditions (e.g., by spreading fecal matter and bacterium wherever the houseflies may land).

There is therefore a need for a reusable apparatus which allows an individual to trap and contain a rodent or a rodent's carcass, bodily fluids, and/or entrails in a relatively sanitary and convenient manner. There is also a need for a method for making a reusable apparatus which overcomes some or all of the previously delineated drawbacks of prior rodent trapping methodologies.

SUMMARY OF THE INVENTION

A first non-limiting advantage of the present invention is that it provides an apparatus which contains a conventional rodent trap and a rodent in a manner which overcomes the previously delineated drawbacks of prior rodent trapping methodologies.

A second non-limiting advantage of the invention is that it provides an apparatus which contains a conventional rodent trap and a rodent in a manner which overcomes the previously delineated drawbacks of prior rodent trapping methodologies and, more particularly an apparatus which includes a plurality of entry apertures and a plurality of arcuately shaped extending ridges which do not allow a partially trapped rodent to escape the apparatus.

A third non-limiting advantage of the present invention is that it provides a method for making an apparatus.

A fourth non-limiting advantage of the present invention is that it provides an apparatus for containing a conventional rodent trap of a certain width. Particularly, the apparatus comprises: a base portion; and a plurality of walls each having a top side and a bottom side, the bottom sides are coupled to the base portion to cooperatively form a containment area, wherein the plurality of walls further comprise at least one entry aperture of a certain width.

A fifth non-limiting advantage of the present invention is that it provides an apparatus for containing a conventional rodent trap of a certain width. Particularly, the apparatus comprises: a base portion; and at least one wall having a top portion and a bottom portion, wherein the bottom portion is coupled to the base portion to form a containment cavity, the at least one wall having at least one entry aperture of a certain width formed there through, and wherein the top portion further comprises a plurality of raised ridges which traverse the top portion.

A sixth non-limiting advantage of the present invention is that it provides a method for making a conventional rodent trap containment apparatus for use with a conventional rodent trap of a certain width. Particularly, the method comprises the steps of: forming a base portion having a periphery; forming at least one wall having a top side and a bottom side; coupling the bottom side of the at least one wall to the base portion, such that the at least one wall traverses said periphery of the base portion; forming a plurality of first arcuately shaped extending ridges upon the top side of the at least one wall; forming a plurality of second arcuately shaped extending ridges upon the top side of the at least one wall; and forming at least one entry aperture of a certain width through the at least one wall.

These and other advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

The present invention may be understood more readily by reference to the following detailed description of preferred embodiments of the invention.

Before the present methods and apparatuses are disclosed and described, it is to be understood that the terminology used herein is for the purpose of describing particular embodiments only and is not intended to be limiting. It must be noted that, as used in the specification and the appended claims, the singular forms "a", "an", and "the" include plural referents unless the context clearly dictates otherwise.

Figure 1:
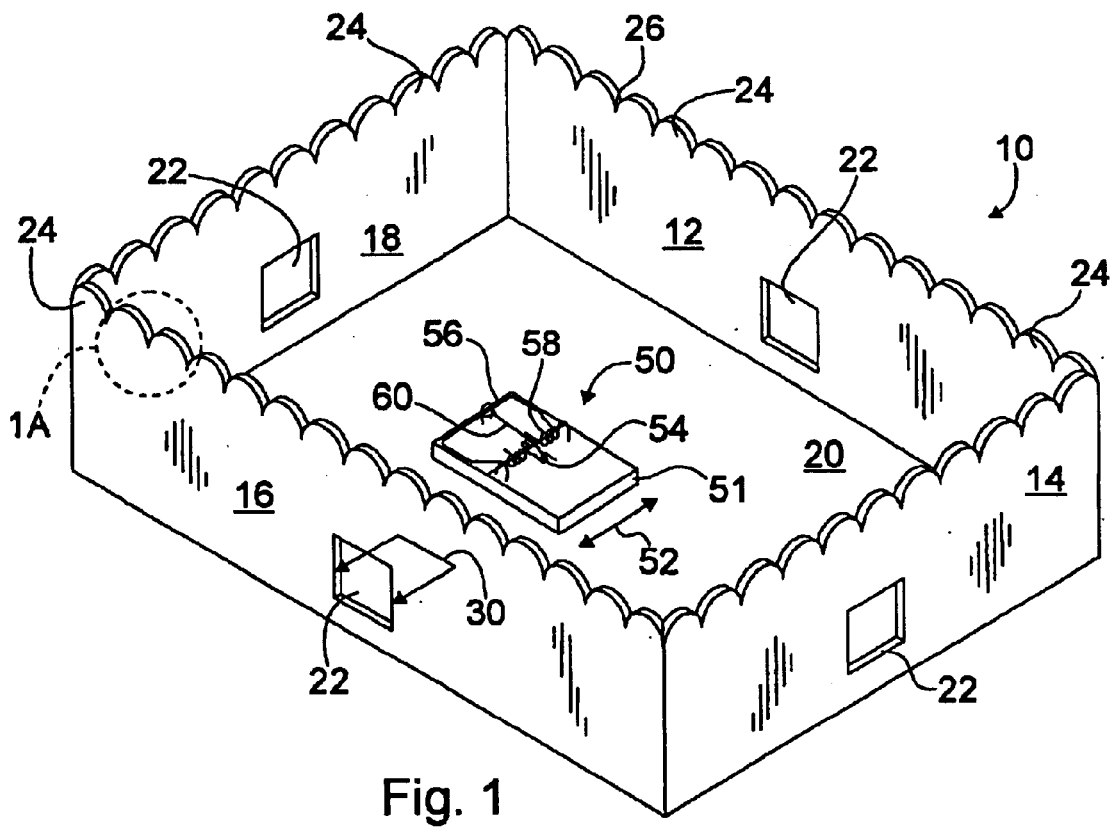
FIG. 1 is a perspective view of a mousetrap containment, apparatus which is made in accordance with the teachings of the preferred embodiment of the invention.
Figure 2:
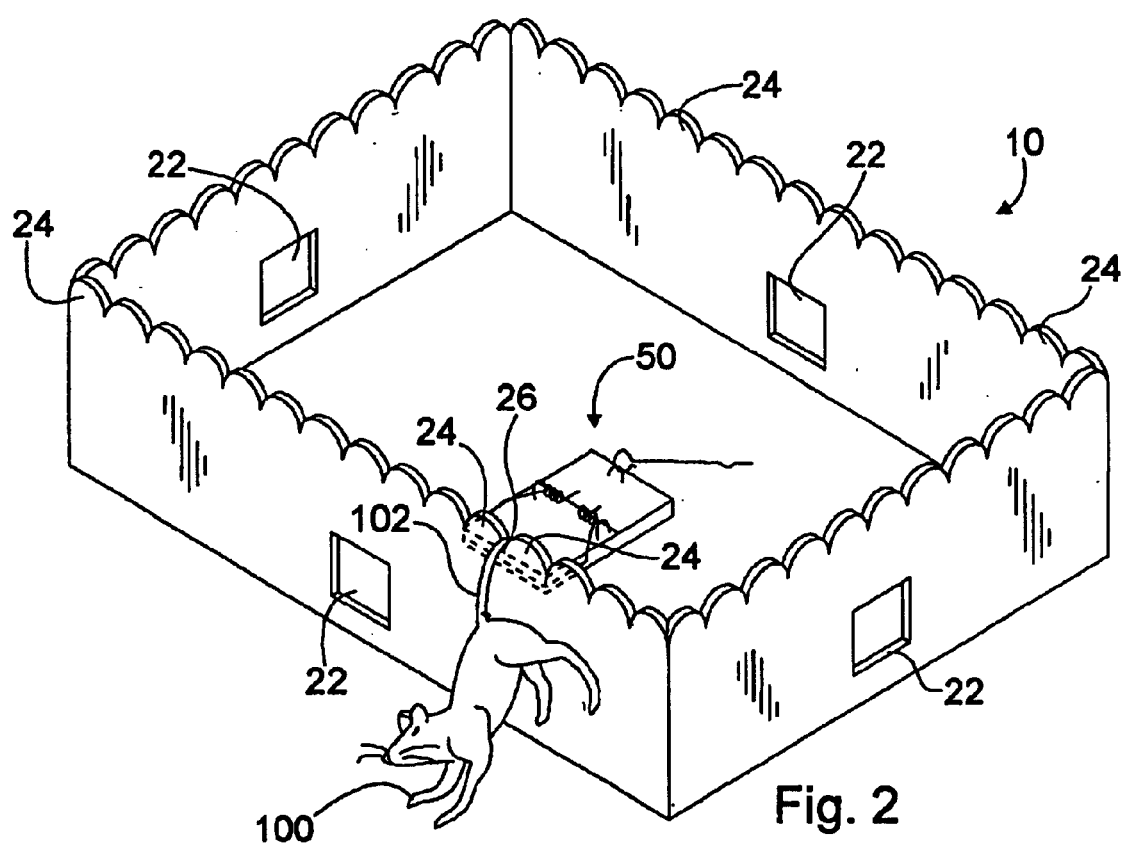
FIG. 2 is a perspective view of the mousetrap containment apparatus of FIG. 1 in combination with a trapped rodent.
Figure 3:
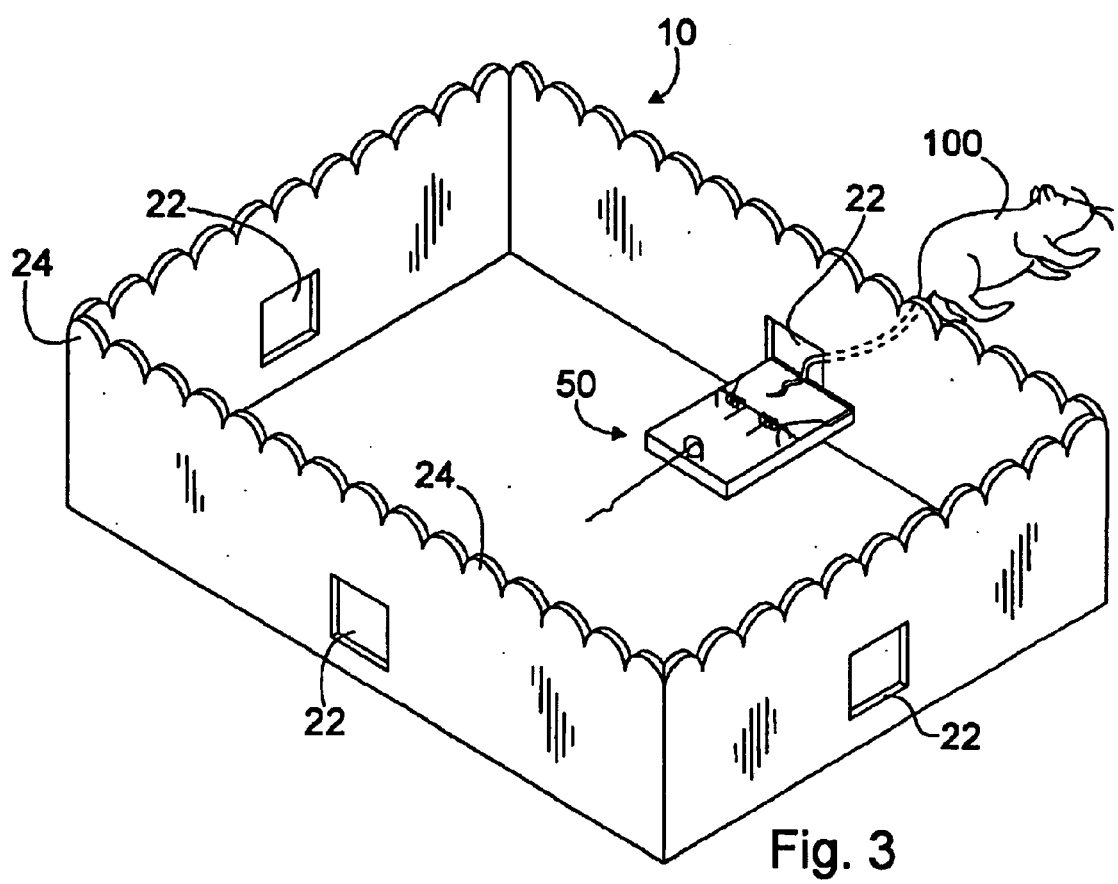
FIG. 3 is a perspective view of the mousetrap containment apparatus of FIG. 1 in combination with a trapped rodent.

Referring now to FIG. 1, there is shown an apparatus 10 which is made in accordance with the teachings of the preferred embodiment of the invention. As shown, apparatus 10 is generally rectangular shaped and includes four walls 12, 14, 16, 18 and a base 20. More particularly, each wall 14–18 is coupled to base 20 along its respective bottom and are interconnected (e.g., wall 12 is coupled to walls 14, 16) to cooperatively form an inner cavity or containment area. Moreover, each respective wall 12–18 further includes a respective and identical entry aperture 22 which permits a rodent to enter the apparatus 10. Each respective wall 12–18 further includes a plurality of arcuately shaped ridges 24 along its top edge (i.e., the side opposite of base 20). It should be appreciated that the apparatus 10 is not limited to the geometrical configuration of a rectangle as shown in FIGS. 1–3. Rather, as should be apparent to one who is skilled in the relevant art, apparatus 10 may be shaped or geometrically configured to substantially any desired shape or geometrical configuration.

Figure 1A:
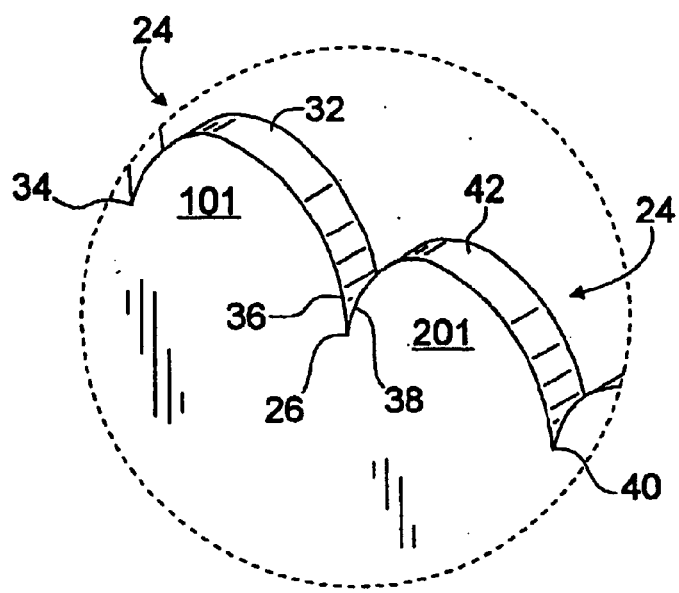
FIG. 1A is a magnified view of a portion of the mousetrap containment apparatus which is shown in FIG. 1.

As shown in the magnified section of FIG. 1A, each grouping of two arcuately shaped ridges 101, 201 form a crux 26. That is, the arcuately shaped ridge 101 includes an arcing portion 32 and a base portion having a first end 34 and a second end 36. The arcuately shaped ridge 201 includes an arcing portion 42 which is identical to the arcing portion 32 of ridge 101 and a base portion having a first end 38 and a second end 40. The first ends 34, 38 of ridges 101, 201 are identical and the second ends 36, 40 of ridges 101, 201 are identical. More importantly, the second end 36 of ridge 101 intersects or meets with the first end 38 of ridge 201, thereby forming the crux 26.

Entry apertures 22 are generally square shaped and have a width 30 which is approximately one inch. It should be understood that since the apertures 22 are generally square in shape, the height of each respective aperture is substantially identical to the width 30 and, therefore is not shown in the FIGS. 1–3. It should be further understood that the plurality of apertures 22 are not limited to the generally square shape which is depicted within the FIGS. 1–3. Rather, as should be apparent to one who is skilled in the relevant art, apertures 22 may be circular, hexagonal, or substantially any desired geometrical configuration. Moreover, it should be understood that the plurality of apertures are not limited to the dimensions of approximately one inch by one inch. Rather, the dimensions are reflective of the type of rodent trap which is employed within the apparatus 10. That is, the dimensions of the plurality of apertures 22 may be created substantially larger if the conventional rodent trap which is employed within the apparatus 10 is designed to trap larger rodents, such as and without limitation rats.

As shown in FIGS. 1–3, apparatus 10 is used in cooperation with a conventional mousetrap 50. At the outset, it should be understood that the conventional mousetrap 50 is not limited to the configuration which is shown in FIGS. 1–3. Rather, as should be appreciated by a skilled artisan, conventional mousetrap 50 may be any conventional mousetrap. Furthermore, conventional mousetrap 50 is not limited to only trapping mice. Rather, conventional rat traps or other rodent traps may be utilized in the place of conventional mousetrap 50.

Conventional mousetrap 50 includes a selectively movable bar 56 which is biased in a downward position by the use of two substantially identical spring portions 58 and held in place by a rod 60 and a lever 54. In this manner the conventional mousetrap 50 is armed or "set". In conventional operation, a rodent, such as and without limitation, a mouse trips the lever 54, thereby releasing the rod 60 which in turn allows the selectively movable bar 56 to forcibly swing from the biased downward position to a position which either kills the rodent or traps a portion of the rodent (e.g., a leg of the rodent or a tail 102 of the rodent).

Figure 4:
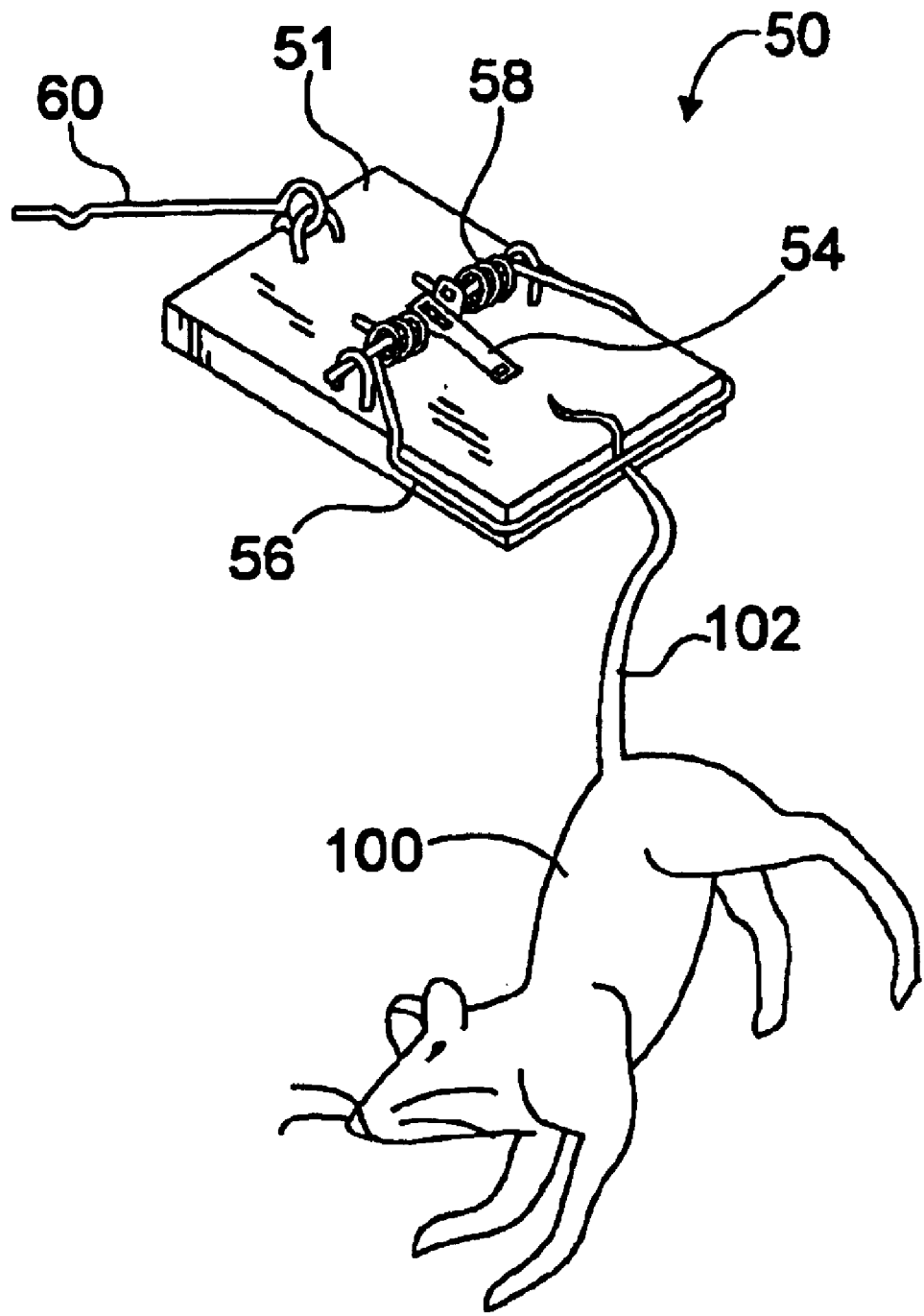
FIG. 4 is a perspective view of a conventional mousetrap in a combination with a trapped rodent.

As shown in FIG. 4, a conventional mousetrap 50 has been sprung by a rodent 100 and has failed to kill the rodent 100. As discussed above, the conventional mousetrap 50 is depicted as having trapped a portion of the rodent 100 (i.e., the tail 102 of the rodent 100) between the selectively movable bar 56 and the wooden or plastic base 51. In this manner, the rodent may be injured, but still may escape by dragging the conventional mousetrap 50. As should be appreciated by one who is skilled in the relevant art, a rodent, such as rodent 100 could potentially drag around a conventional mousetrap 50 until the portion of the rodent's body which is trapped falls off or rots away (i.e., the amount of pressure which is applied by the selectively movable bar 56 acts as a tourniquet to the trapped portion and, the trapped portion will eventually fall off or rot off).

As shown in FIGS. 2 and 3, apparatus 10 prevents a rodent 100, having at least a portion of its body trapped by mousetrap 50 (e.g., the rodent's tail 102 is trapped), from exiting the apparatus 10. The first unique aspect which prevents a rodent 100 from exiting the apparatus 10 is the plurality of arcuately shaped ridges 24. That is, as best shown in FIG. 2, once a rodent 100 has entered the apparatus 10 through one of the plurality of apertures 22 and has sprung the conventional mousetrap 50 which has trapped the tail 102 of the rodent 100, the rodent 100 may attempt to escape the apparatus 10 by jumping or crawling over one of the four walls 12–18. If the rodent tries to escape the apparatus 10 by jumping or crawling over one of the four walls 12–18, the tail 102 of the rodent 100 will contact one of the plurality of arcing portions, such as 32, 42. Inevitably, the tail 102 of the rodent 100 will slide down one of the arcing portions 32, 42 and get caught within a crux 26 formed between a second end 36 and a first end 38, thereby forcing the conventional mousetrap 50 to abut one of the four walls 12–18 beneath the plurality of arcing portions (e.g., arcing portions 32, 42). That is, the rodent 100 may be able to get over the wall, however the rodent's tail 102 will not be able to clear the ridges 24 in order to allow the conventional mousetrap 50 to get over the walls 12–18 or the arcing portions 32, 42, thereby preventing the rodent 100 from completely escaping the apparatus 10.

Apparatus 10 further prevents a rodent 100 from exiting the apparatus 10 in that the plurality of apertures 22 permit a rodent 100 to enter the apparatus 10, but will not allow a "trapped" rodent to exit through apertures 22. That is, as best shown in FIG. 3, once a rodent 100 has entered the apparatus 10 through one of the plurality of apertures 22 and has sprung the conventional mousetrap 50 which has trapped the tail 102 of the rodent 100, the rodent 100 may attempt to escape the apparatus 10 by exiting through one of the plurality of apertures 22. However, the geometrical configuration of the apertures 22 prevents a conventional mousetrap 50 from passing through. That is, as best shown in FIG. 1, conventional mousetrap 50 has a certain width 52 which is approximately one and three-quarters of an inch and, as discussed above, the plurality of apertures 22 have a width 30 which is approximately one inch. Hence, the conventional mousetrap 50 cannot pass through the conventional apertures 22. In this manner, a rodent 100 that enters the apparatus 10 and gets a portion of its body trapped within the conventional mousetrap 50 may partially escape the apparatus 10 by crawling through one of the plurality of apertures 22, however, the rodent 100 cannot completely escape the apparatus 10 because the apparatus 10 is designed to contain the conventional mousetrap 50.

Figure 5:
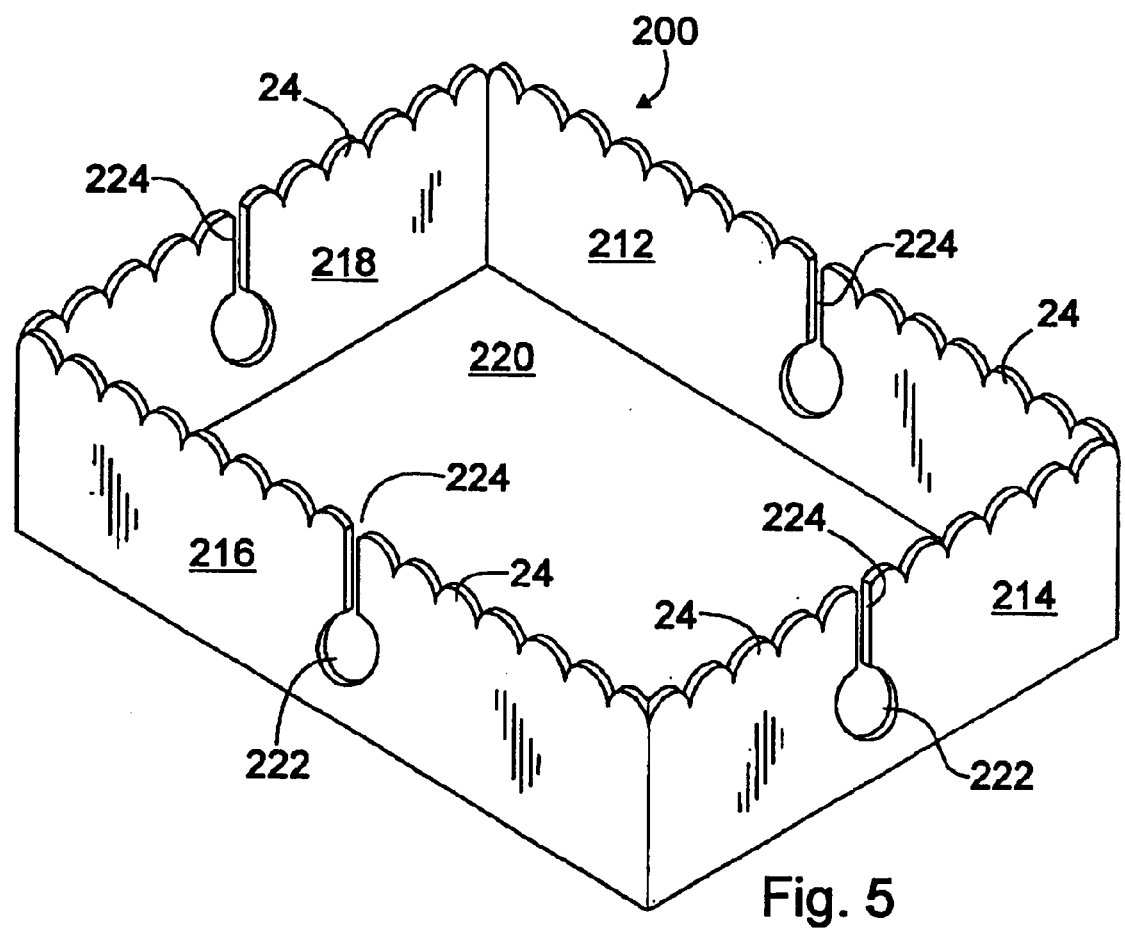
FIG. 5 is a perspective view of a mousetrap containment apparatus which is made in accordance with the teachings of an alternate embodiment of the invention.

Referring now to FIG. 5, there is shown an apparatus 200 which is made in accordance with the teachings of an alternate embodiment of the invention. As shown, apparatus 200 is generally rectangular shaped and includes four walls 212, 214, 216, 218 and a base 220 which are substantially the same as walls 12, 14, 16, 18 and base 20 of the preferred embodiment. More particularly, each respective wall 212–218 further includes a respective and identical entry aperture 222 which permits a rodent to enter the apparatus 200. Each identical entry aperture 222 is generally circular in shape and further includes a narrow channel 224. That is, narrow channel 224 traverses each respective wall 212–218 from the top of each respective entry aperture 222 to the top of the apparatus 200. Each respective wall 212–218 further includes a plurality of arcuately shaped ridges 24, as described above. It should be appreciated that, in this alternate embodiment, the circular shaped entry apertures 222 in cooperation with the narrow channels 224 allow a rodent, such as rodent 100, to be easily and conveniently disposed of in a manner which is substantially sanitary. That is, the generally circular shape of the entry apertures 222 allows for the apparatus 200 to be turned upside down without the tail of the rodent catching on or being obstructed by any protruding edges or corners. Furthermore, when the apparatus has been turned upside down, a rodent 100 trapped by the apparatus 200, in the manner which was previously described in reference to FIG. 3 (i.e., the rodent 100 has traversed through the entry aperture 22 and the conventional mousetrap 50 will not pass through the aperture 22, thereby preventing the rodent 100 from escaping the apparatus 10), may be easily removed from the apparatus 200 by the narrow channels 224 (i.e., the tail of the rodent will slide through the channel 224 from the entry aperture 222, thereby allowing the rodent to be removed from the apparatus 200 without user interaction with the rodent). In one non-limiting embodiment, the narrow channels 224 may be covered (not shown) and may be perforated (also not shown), effective to allow a user to either selectively remove the perforated channels (i.e., thereby creating the open channels 224) or selectively maintain the integrity of the perforations (i.e., thereby keeping the channels 224 closed).

It should be appreciated that the apparatuses 10 and 200 may be constructed out of substantially any desired water resistant and durable material. That is, apparatuses 10 and 200 may be constructed from conventional plastics, metals, woods, and the like. Furthermore, it should be appreciated that the apparatuses 10 and 200 further provide reusable protection from the bodily fluids and entrails of the rodent traversing outside of the apparatuses 10 and 200 upon a rodent being killed by the conventional mousetrap 50. That is, the apparatuses 10 and 200 contain substantially all of the "spattering" effect that may possibly occur from the force of the selectively movable bar 56 impacting a rodent 100 and, due to the materials from which the apparatuses 10 and 200 may be constructed, the apparatuses 10 and 200 may be easily washed or rinsed out without damaging the apparatuses 10 and 200.

It should be further appreciated that the apparatuses 10 and 200 allow a user (i.e., an individual that has placed a conventional mousetrap 50 within the apparatuses 10 and 200) to quickly and conveniently dispose of a rodent's carcass while obviating contact with the carcass, entrails, or bodily fluids of the rodent (e.g., a user may simply pick up either the apparatus 10 or the apparatus 200 and only contact the apparatus 10 or the apparatus 200 in order to dump or dispose the rodent's carcass within a trash can, trash bag, and the like.

It should be understood that this invention is not limited to the exact construction or embodiments listed and described, but that various changes may be made without departing from the spirit and scope of the invention.

What is claimed is:

1. An apparatus for containing a conventional rodent trap of a certain width, said apparatus comprising:
   a base portion;
   a plurality of walls, each wall having a top side and a bottom side, said bottom sides are coupled to said base portion to cooperatively form a containment area, wherein said plurality of walls further comprise at least one entry aperture of a certain width; and
   a first, second, third, and at least one fourth plurality of arcuately shaped raised ridges, wherein said first plurality of arcuately shaped raised ridges are disposed upon and across said top side of a first of said plurality of walls, wherein said second plurality of arcuately shaped raised ridges are disposed upon and across said top side of a second of said plurality of walls, wherein said third plurality of arcuately shaped raised ridges are disposed upon and across said top side of a third of said plurality of walls, wherein said at least one fourth plurality of arcuately shaped raised ridges are disposed upon and across said top side of at least a fourth of said plurality of walls, each arcuately shaped raised ridge of said first, said second, said third, and said at least one fourth plurality of arcuately shaped raised ridges comprises a top arcing portion and a base portion having a first side and a second side.

2. The apparatus of claim 1 wherein said plurality of arcuately shaped ridges further cooperatively form a plurality of cruxes.

3. The apparatus of claim 2 wherein said certain width of said at least one entry aperture is substantially less than said certain width of said conventional rodent trap.

4. The apparatus of claim 3 wherein said apparatus is made from a durable and water resistant material.

5. The apparatus of claim 4 wherein said durable material is plastic material.

6. The apparatus of claim 4 wherein said durable material is metal material.

7. An apparatus for containing a conventional rodent trap of a certain width, said apparatus comprising:

a base portion;

at least one wall having a top portion and a bottom portion, wherein said bottom portion is coupled to said base portion to surround said base portion and form a containment cavity, said at least one wall having at least one entry aperture of a certain width formed there through, and wherein said top portion further comprises a plurality of fixed raised ridges which are along said top portion, said at least one aperture is generally circular in shape and further comprises a top portion, said apparatus further including a narrow channel which vertically traverses said at least one wall from said top portion of said circular aperture to said top portion of said at least one wall.

8. The apparatus of claim 7 wherein said plurality of raised ridges are further arcuately shaped and each further comprise:

a top arcing portion; and a base portion having a first side and a second side.

9. The apparatus of claim 8 wherein each of said first sides of said plurality of arcuately shaped ridges cooperate with a second side of a respective and adjacent one of said plurality of arcuately shaped ridges to form a plurality of cruxes.

10. The apparatus of claim 7 wherein said certain width of said conventional rodent trap is substantially larger than said certain width of said at least one entry aperture.

11. The apparatus of claim 7 wherein said base portion and said at least one wall are further constructed from a durable and water resistant material.

12. The apparatus of claim 11 wherein said durable and water resistant material is a plastic material.

13. The apparatus of claim 11 wherein said durable and water resistant material is a metal material.

14. A method for making a conventional rodent trap containment apparatus for use with a conventional rodent trap of a certain width, said method comprising the steps of:

forming a base portion having a periphery;

forming at least one wall having a top side and a bottom side;

coupling said bottom side of said at least one wall to said base portion, such that said at least one wall traverses said periphery of said base portion thereby forming a containment cavity;

forming a plurality of arcuately shaped extending ridges upon said top side of said at least one wall, wherein said plurality of ridges are shaped to form a crux between each adjacent ridge;

forming at least one entry aperture of a certain width through said at least one wall, said at least one aperture being generally circular in shape and further comprises a top portion; and forming a narrow channel which vertically traverses said at least one wall from said top portion of said at least one circular aperture to said top portion of said at least one wall.

15. The method of claim 14 wherein said step of forming at least one entry aperture through said at least one wall further comprises the step of making said certain width of said aperture substantially smaller than said certain width of said conventional rodent trap.

16. The method of claim 15 wherein said step of forming a plurality of arcuately shaped extending ridges upon said top side of said at least one wall further comprises the steps of:

forming a top arcing portion upon each of said plurality of arcuately shaped extending ridges;

forming a base portion having a first side and a second side upon each of said arcuately shaped extending ridges; and aligning each one of said first sides of said plurality of arcuately shaped extending ridges with a second side of an adjacent one of said plurality of arcuately shaped extending ridges, thereby creating each of said cruxes.

17. The method of claim 16 wherein said steps of forming a base portion having a periphery and forming at least one wall having a top side and a bottom side further comprise the step of using a water resistant and durable material to form said base portion and said at least one wall.

\* \* \* \* \*